Jan. 6, 1925.
W. G. GRIBBEL
1,522,118
GAS METER
Filed Oct. 27, 1921
4 Sheets-Sheet 1
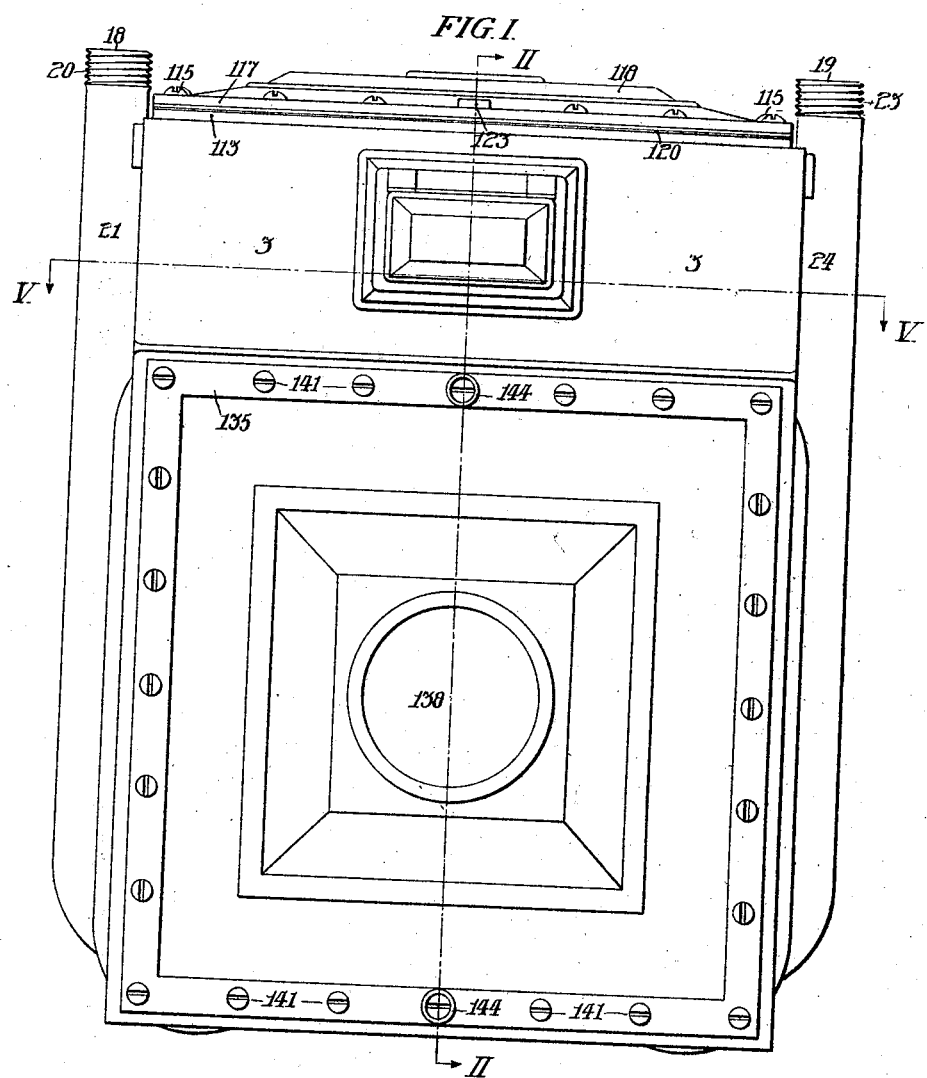
FIG. I
INVENTOR
WAKEMAN GRIFFIN GRIBBEL,
ATTORNEYS

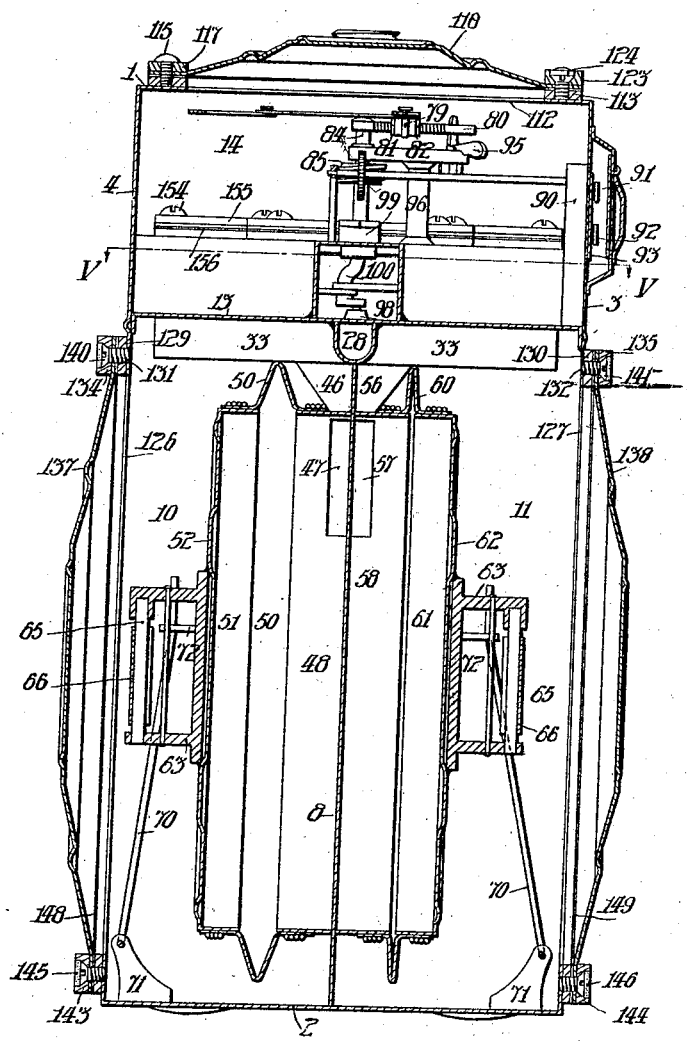

Jan. 6, 1925.
W. G. GRIBBEL
1,522,118
GAS METER
Filed Oct. 27, 1921 4 Sheets-Sheet 3
FIG. III.
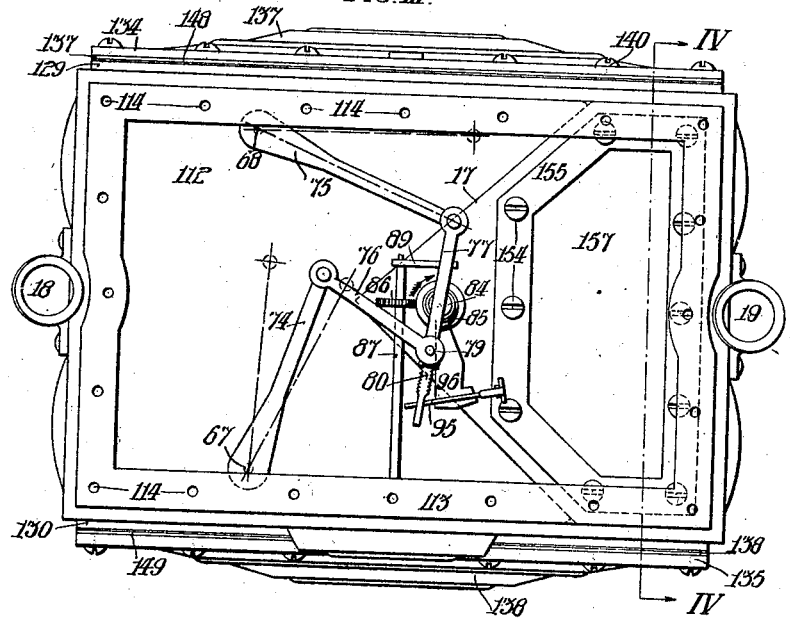
FIG. IV.
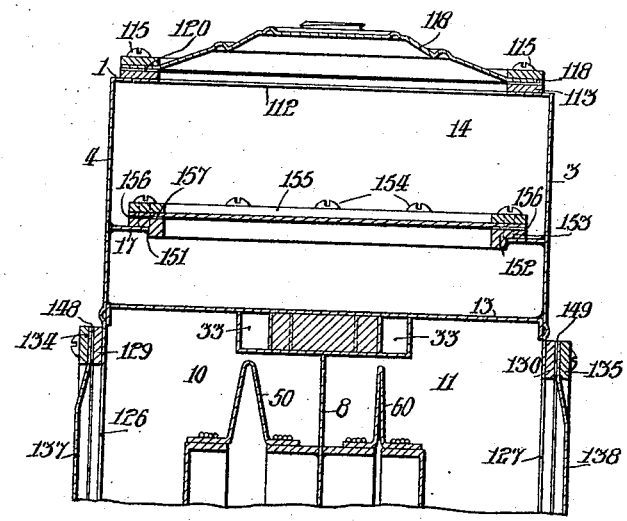
INVENTOR
WAKEMAN GRIFFIN GRIBBEL,
BY
ATTORNEY Jan. 6, 1925.
W. G. GRIBBEL
1,522,118
GAS METER
Filed Oct. 27, 1921
4 Sheets-Sheet 4
FIG. V.
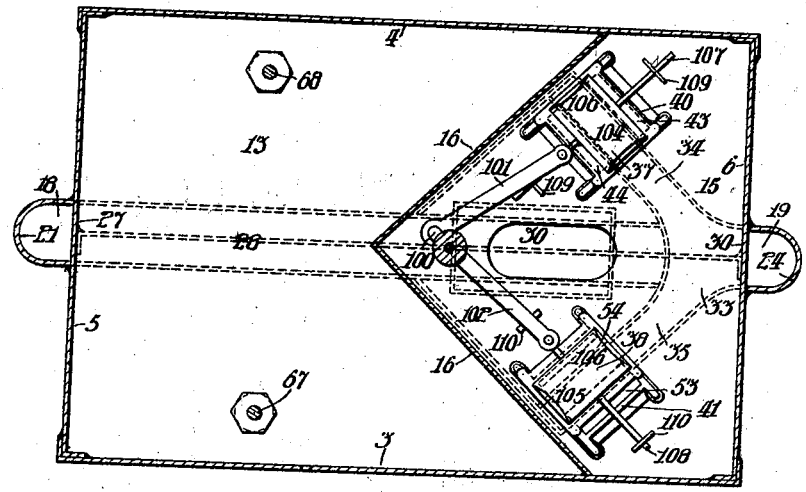
FIG. VI.
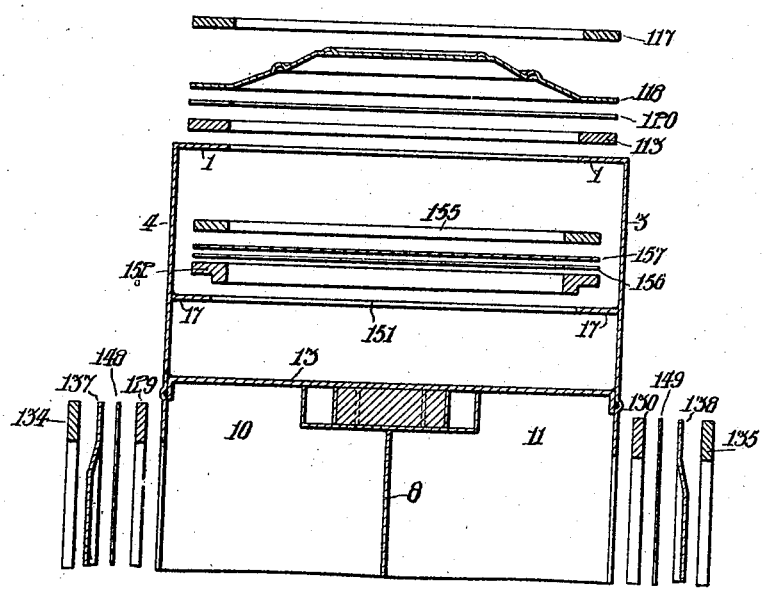
FIG. VII.
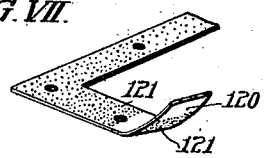
INVENTOR
WAKEMAN GRIFFIN GRIBBEL,
BY
ATTORNEY Patented Jan. 6, 1925.

1,522,118

UNITED STATES PATENT OFFICE.

WAKEMAN GRIFFIN GRIBBEL, OF PHILADELPHIA, PENNSYLVANIA.

GAS METER.

Application filed October 27, 1921. Serial No. 510,836.

*To all whom it may concern:*

Be it known that I, WAKEMAN GRIFFIN GRIBBEL, a citizen of the United States, residing at Philadelphia, in the county of Philadelphia and State of Pennsylvania, have invented a certain new and useful Improvement in Gas Meters, whereof the following is a specification, reference being had to the accompanying drawings.

My invention relates to a meter including a casing having a gas inlet and a gas outlet, and inclosing registering mechanism which is operated by two bellows coupled to a crank shaft, which crank shaft is arranged to operate two slide valves, in alternation, which slide valves respectively control ports leading to and from said bellows, in communication with said gas inlet and gas outlet. Said meter mechanism includes means for adjustably varying its operation in accordance with the volume of gas delivered through said bellows, so as to accurately indicate the volume of gas dispensed through said meter outlet. Such bellows include flexible elements which are more or less distended in accordance with the pressure of the gas dispensed therethrough. Therefore, it is necessary to adjust the registering mechanism in accordance with the pressure of gas to be dispensed. Moreover, such flexible elements are conveniently formed of leather saturated with oil which, in course of time, is dissipated so that the leather becomes sufficiently porous to permit gas to leak therethrough. Therefore, it is necessary to resaturate the leather of said bellows with oil, from time to time, to render it gastight. Therefore, it is necessary to have access to the interior of said casing, from time to time, to effect such adjustments and repairs as are necessitated by the varying conditions and wear to which such a meter may be subjected. However, it has been the practice hitherto to form the casings of such gas meters of sheet tin walls hermetically soldered together in integral relation, so that, whenever it is necessary to have access to the interior thereof, the soldered joints must be melted to open such a meter casing, and resoldered after the adjustment or repairs are made. Such meter casings are made of sheet tin rather than cast metal, to minimize the weight thereof; because the peculiar conditions under which they must be installed in different premises where the gas is consumed, necessitates considerable transportation of much meters by hand, and, of course, the difficulty and cost of such installation is more or less proportionate to the weight of the meters and consequent difficulty in handling them. For instance, the accompanying drawings show a small house meter embodying my improvement and weighing but twenty pounds and four ounces. A cast metal meter of the same capacity weighs more than thirty-five pounds. One person can carry at least two of the meters shown, but it is obvious that one person could not carry two such cast metal meters, in addition to the kit of tools necessary to install the same and, consequently, such diminution in weight permits one operator to make two installations on one trip instead of but one installation on one trip to and from the place where such meters are kept in stock.

As shown in said drawings, the means for adjusting the registering mechanism are in a chamber of the meter casing to which access may be had by removing the top of the casing. However, the valve mechanism must be secluded from said chamber containing the adjusting mechanism to permit operation of the meter as hereinafter described and, therefore, said valve mechanism is inclosed in a separate compartment which must also be opened to afford access to the valve mechanism for adjustment and repairs. Moreover, the two bellows aforesaid are necessarily inclosed in respectively separate compartments to enable them to operate as described and, consequently, it is necessary to open each of those compartments to repair said bellows. In other words; if a meter is to be completely examined and repaired, the casing thereof must be opened in four different places and, as above noted, to effect such opening and closure of a soldered casing is a very costly operation.

Therefore, it is the object and effect of my invention to provide a meter casing which, while having the advantages of the old thin sheet metal casing as to minimum weight and imperviousness to gas, is so constructed and arranged that it may be readily opened and closed at each of the four regions above contemplated, without any soldering operation.

As hereinafter described, an essential feature of my invention is that at each of the regions where it is necessary to open the thin sheet metal casing, the latter is reinforced by a thick metal frame, hereinafter termed a pad, which is permanently secured to the casing, conveniently by solder. That pad has its outer face provided with a separable annular gasket extending entirely around the opening in the casing; which gasket is formed of flexible material which is impervious to gas and, as hereinafter described, is conveniently formed of a cellulose fabric impregnated with a cement which is primarily liquid and which fills the pores of said fabric and is more or less adherent to the adjacent faces of the metal. Such gaskets are interposed between the respective pads and removable cover plates which, as hereinafter described, are conveniently formed of panels of thin sheet metal, coextensive with the outside dimensions of said pads, and having smooth plane margins arranged to bear upon said gaskets. Such cover plates are arranged to be detachably secured upon the meter casing with their margins aforesaid held in contact with said gaskets, by separate, thick metal annular marginal frames, arranged to be detachably secured upon the meter casing by screws which extend loosely through holes in said frames and through holes in said cover plates into engagement with corresponding screw threaded sockets in said pads.

The annular pads and cover frames above contemplated are each made of metal which, although thicker than the thin sheet metal plates aforesaid, is so far flexible that said cover plates may be secured in hermetically sealed relation with said pads without the provision of finished plane surfaces upon either said pads or said cover frames; such flexibility obviating the necessity for the costly finishing operations which are usually necessary when cast metal parts are to be fitted together in hermetically sealed relation. However, it is to be noted that said casing pads and cover frames must have a greater degree of rigidity than the thin sheet metal of which the remainder of the meter casing is formed, for the latter is so far flexible that it would bend at the edge of any opening therethrough unless reinforced, as hereinafter described.

Moreover, as gas meters are necessarily subjected to considerable rough usage in transportation and installation, and are frequently dropped by the operators who handle them; it is important to note that whereas every part of a cast metal meter is brittle and liable to crack if the meter is dropped; the composite construction which is characteristic of my invention has such a degree of flexibility throughout that it is not damaged by such stresses.

My invention includes the various novel features of construction and arrangement hereinafter more definitely specified, whereby the thin sheet metal of the meter casing is reinforced and rendered susceptible of opening and closing without the employment of solder.

It is characteristic of the specific form of my invention herein claimed that the thick marginal frames for the thin sheet metal closures are separate from and independent of the latter, whereas, in my copending application Serial No. 507,815 filed October 15, 1921, I claim a different specific form wherein the marginal frames for the closure plates are permanently connected therewith. However, the generic claims in that case are intended to cover both of said specific forms.

In said drawings; Fig. I is a front elevation of a meter conveniently embodying my improvement, with its casing in normally operative hermetically sealed condition.

Fig. II is a vertical sectional view of the complete meter, taken on the line II, II in Fig. I, in the direction of the arrows marked thereon.

Fig. III is a plan view of said meter, except that the top cover plate and the annular marginal frame by which it is secured are removed, to afford access to the adjusting mechanism aforesaid.

Fig. IV is a fragmentary vertical sectional view of said meter, taken on the line IV, IV in Fig. III, in the direction of the arrows marked thereon, and showing all of the four removable cover plates and their appurtenances.

Fig. V is a plan sectional view, taken on the line V, V in Figs. I and II, in the direction of the arrows marked thereon, showing the construction and arrangement of the valve mechanism.

Fig. VI is a fragmentary vertical sectional view, similar to Fig. IV, but with the several pads, gaskets, cover plates, and cover plate frames shown in separate relation.

Fig. VII is a fragmentary, perspective view of a portion of one of the annular gaskets indicated in Fig. VI.

In said figures; the thin sheet metal casing comprises the top wall 1, bottom wall 2, front wall 3, back wall 4, left hand side wall 5, and right hand side wall 6. As indicated in Figs. II, IV, V and VI, the central, vertical partition 8, which is formed of thin sheet metal, is permanently secured in said casing, extending parallel with said front wall 3 and back wall 4, and separating the two bellows compartments 10 and 11 into which the lower portion of said casing is thus equally divided by it. The horizontal partition 13, which is also permanently secured in said meter casing, extends above said two bellows compartments 10 and 11, as indicated in said figures, and forms the floor of the crank compartment 14, which contains the adjustable registering mechanism hereinafter described. The valve compartment 15 is formed within said crank compartment 14 by the vertical angular partition 16, shown in Fig. V, and the horizontal wall 17 shown in Figs. IV and VI; which partition and wall are also permanently secured in said casing.

The gas inlet 18 and the gas outlet 19 are located respectively upon the left and the right hand side of said casing, as indicated in Figs. I, III and V. Said inlet 18 includes the cast metal screw coupling member 20, and the thin sheet metal conduit 21, both of which are permanently connected with said left hand casing wall 5. Said gas outlet 19 includes the cast metal screw coupling member 23 and the thin sheet metal conduit 24, both of which are permanently connected with said right hand casing wall 6.

Said gas inlet 18 and conduit 21 communicate with the interior of said casing through the port 27 in said left hand casing wall 5 indicated in Fig. V; which port registers with the conduit 28 shown in Fig. II and indicated in Fig. V. Said conduit 28 is a permanent fixture in said casing and registers with the port 30 in said horizontal partition 13, within said valve chamber 15, as indicated in Fig. V, to conduct the gas from said inlet 18 into said valve chamber 15. The portion of said inlet conduit 21 extending vertically below the port 27 in said wall 5, as indicated in Figs. I and V, serves as a trap to catch the small percentage of moisture which is entrained in the gas and condensed in contact with the metal conductors through which the gas flows. The capacity of said trap is such that it is only necessary to empty it at intervals of several years.

Said gas outlet conduit 24 registers with the port 32 in the right hand side wall 6 of the meter casing, as indicated in Fig. V, and also communicates with the interior of said valve chamber, through the Y-shaped conduit 33 indicated in Figs. II, IV and V, the respective branches 34 and 35 of which respectively register with ports 37 and 38 in the stationary valve seats 40 and 41 which are permanently connected with said partition 13, as shown in Fig. V. Each of said valve seats has three ports. Said valve seat 40 includes the centrally disposed port 37 in communication with said gas outlet 19 as described; also the port 43 opening directly through said partition 13 from said valve chamber 15 into the bellows chamber 10; and the port 44 opening from said valve chamber 15 into the conduit 46, shown in Fig. II, which registers with the port 47 in the bellows base ring 48 to conduct gas to and from the interior of the bellows which includes the flexible leather diaphragm 50 and the movable ring 51, which is complementary to said ring 48, and movable toward and away from the latter by the pressure of gas alternately admitted upon opposite sides of the diaphragm 52 which is rigidly connected with said ring 51.

Said valve seat 41 is similarly constructed and arranged, having the central port 38 in communication with said gas outlet 19 as above described, and also having the port 53 leading directly through said partition 13 from said valve chamber 15 into said bellows chamber 11; and also having the port 54 opening from said valve chamber 15 into the conduit 56, shown in Fig. II, which registers with the port 57 in the bellows base ring 58 to conduct gas to and from the interior of the bellows which includes the flexible leather diaphragm 60 and movable ring 61, which is complementary to said ring 58, and movable toward and away from the latter by the pressure of gas alternately admitted upon opposite sides of the diaphragm 62 which is rigidly connected with said ring 61.

As indicated in Fig. II; said diaphragms 52 and 62 have respective brackets 63 so that they may be pivotally supported by respective pintles 65 rigidly connected with rock frames 66 respectively rigidly connected with the rock shafts 67 and 68, so that said shafts are rocked by the movement of said diaphragms as said bellows members 50 and 60 are alternately expanded and collapsed by the pressure of gas within and without said bellows. Said diaphragms 52 and 62 are maintained in substantially parallel relation during such movement by respective bail levers 70 which are journaled in brackets 71 rigidly connected with the bottom plate 2 of the meter casing, as indicated in Fig. II, and have their upwardly projecting arms extending through slide bearing plates 72 on the respective diaphragms.

As shown in Figs. III and V; said rock shafts 67 and 68 have respective lever arms 74 and 75, rigidly connected therewith, in such relation that the rocking movement of said shafts 67 and 68, under the operation of said bellows, causes said arms to oscillate from one extreme position to the other indicated respectively by dash and dot and dash lines in Fig. III. Said rock lever arms 74 and 75 are respectively pivotally connected to links 76 and 77, and said links are both pivotally connected to the crank stud 79 shown in Figs. II and III, which stud is mounted upon the crank 80, which is flattened at its upper and lower surfaces, so that said stud cannot turn thereon but is screw threaded at its opposite edges to engage the nuts 81 and 82 upon respectively radially opposite sides of said stud 79 so that said stud may be adjusted toward and away from the axis of the crank shaft 84 which it is the object of said bellows lever and link mechanism to rotate in definite relation to the volume of gas dispensed through the meter. Said crank shaft 84 has rigidly mounted thereon, the worm 85 which engages the worm wheel 86 on the register shaft 87. Said shaft 87 is journaled in the stationary bracket 89 and in the frame 90, which latter incloses the registering mechanism comprising a train of gears of ordinary construction and which is so arranged as to rotate a series of radial index pointers 91, 92 etc., in conjunction with dials upon the plate 93, indicated in Fig. II, to indicate the volume of gas dispensed. It is intended that said shaft 84 shall rotate in the direction indicated by the arrow shown concentric therewith in Fig. III, and to normally prevent its reverse rotation, a tiltable stop lever 95 is pivoted in the bracket 96 which is rigidly connected with the stationary partition wall 17 forming the top of the valve compartment.

Said crank shaft 84 is journaled in said bracket 96 and in the step bearing 98 which is rigidly connected with the partition 13 as indicated in Fig. II, and said shaft 84 extends through the stuffing box 99 which is supported by said partition 17 and prevents escape of gas from said valve compartment 15 into said crank compartment 14. Said crank shaft has the crank 100, indicated in Figs. II and V pivotally connected with the respective links 101 and 102 which are respectively pivotally connected with the slide valves 104 and 105, to slide the latter back and forth upon their respective valve seats 40 and 41. Each of said valves 104 and 105 has a recess 106 arranged to alternately connect the opposite end ports with its central port in its seat. Said valves are loosely mounted upon said seats, so as to be maintained in gas-tight relation therewith by the pressure of gas in said valve chamber 15, but are limited to rectilinear reciprocation on their respective seats by their respective slide bars 107 and 108 which extend through the brackets 109 and 110 which are rigidly connected with said partition 13 in the positions indicated in Fig. V and project upwardly therefrom.

The mechanism above described operates as follows: Said meter being connected by its inlet 18 and outlet 19 with a piping system through which gas is to be dispensed; said mechanism remains stationary until a gas vent is afforded in communication with said outlet 19. Thereupon, the gas flows through the meter and is alternately admitted to and expelled from the two bellows above described, causing the alternate expansion and collapse of their respective flexible elements 50 and 60 shown in Fig. II; with the result that said crank shaft 84 is continuously rotated in the direction of the arrow indicated in Fig. III to operate the aforesaid registering mechanism by the register shaft 87 and, incidentally, to operate the valve mechanism which controls the passage of gas to and from said bellows chambers 10 and 11 and to and from the interior of the respective bellows in said chambers. It may be observed that the arrangement of the bellows motor mechanism above described is such that in whatever position it may be stopped by closing the gas vents in communication with the meter gas outlet 19; there is no "dead center." The mechanism is always adapted to instantly start again upon resumption of the flow of gas through the meter.

As above contemplated; it is necessary to precisely adjust the position of said crank stud 79 in the crank chamber 14 to precisely determine the extent of the effective throw of the crank 80 to correctly indicate by the registering mechanism 91 etc., the actual volume of gas dispensed, in accordance with the pressure of the latter which distends said flexible members 50 and 60 of the bellows mechanism. Therefore, it is necessary to open the meter casing at its top and, for that purpose, I provide the opening 112 in the top wall 1 of the meter, as indicated in Fig. II, and permanently reinforce the edge of that opening with the thick metal pad 113 which, as shown in Fig. III, is annular, extends entirely around said opening 112, and has a series of sockets 114, for clamping screws 115, which, as indicated in Fig. II, normally extend in engagement with said sockets, clamping around said opening 112 the annular cover frame 117 complementary to said stationary pad frame 113. Said frame 117 is of heavier metal than the thin walls of said casing and is arranged to secure the cover plate 118 of thin metal which has its margins extending between said cover frame 117 and said pad frame 113, as shown. The gasket interposed between said pad 113 and cover plate frame 117, as indicated in Figs. II and IV, is preferably formed as indicated in Fig. VII, comprising a web of cellulose fabric 120 coated upon its opposite sides with an adhesive cement 121, which impregnates the pores of said fabric 120 and renders the latter impervious to gas.

As indicated in Fig. II; said cover plate frame 117 has a socket 123, formed by an upwardly extending flange thereon, encircling one of said screws 115, and adapted to hold a sealing compound 124 therein, so that it is necessary to break such seal to remove said cover plate. Such protection is desirable to indicate if any unauthorized person has tampered with the meter.

As above contemplated, it is also necessary to have access to the respective bellows chambers 10 and 11 aforesaid, to resaturate with oil the respective flexible elements 50 and 60 which are respectively inclosed in said chambers. Therefore, I provide said chambers with respective openings 126 and 127, respectively in said rear wall 4 and front wall 3 of the casing, which are formed of thin sheet metal as above described, and reinforce the margins of said openings with respective annular pads 129 and 130 which are permanently secured thereon and provided with series of screw threaded sockets 131 and 132. I also provide said openings 126 and 127 with respective annular cover plate frames; the frame 134 being complementary to said pad 129, and the frame 135 being complementary to said pad 130. Said frames 134 and 135 respectively clamp the thin sheet metal cover plates 137 and 138 over said openings 126 and 127, as indicated in Fig. II, and said cover plates are arranged to be removably connected with the meter casing by respective series of screws 140 and 141 extending through them as indicated in Fig. II. As also indicated in Fig. II; such screws 140 and 141 may be set in pockets 143 and 144 in the respective cover frames 134 and 135; which pockets are adapted to hold sealing means 145 and 146 which must be broken to permit removal of said cover plates 137 and 138. The gaskets 148 and 149, which are respectively fitted to the outer faces of said pads 129 and 130 to seal the joints between said pads and said cover plates 137 and 138, are conveniently constructed as above described with reference to Fig. VII.

As above contemplated; it is also necessary to have access to the interior of said valve compartment 15 and, therefore, I provide the same with the opening 151 in the partition 17, as indicated in Figs. IV and VI, and reinforce the edge of said opening with the thick metal pad 152 which, as indicated in Fig. IV, has a series of screw threaded sockets 153 for engagement with the clamping screws 154 which clamp the removable annular cover plate frame 155 around said opening 151. The annular gasket 156 is interposed between said pad 152 and the thin sheet metal cover plate 157 which is clamped thereon by said frame 155 and screws 154. Said gasket 156 may also be constructed and arranged as above described with reference to Fig. VII.

Therefore, it is to be understood that the construction and arrangement of my improved meter is such that every portion of the interior thereof which it is necessary or desirable to inspect for adjustment or repairs is rendered readily accessible without any soldering operation and, although the cover plates may be readily removed by manipulation of the clamping screws aforesaid with an ordinary screw driver; the sealing means applied to said screws as above described are arranged to indicate if any unauthorized person has attempted to remove any of said cover plates.

I have described the meter bellows motor mechanism in detail, in order to show the complex nature thereof, and indicate the necessity for having access to the several different regions of the meter casing which I have provided with removable cover plates. However, it is to be understood that I do not desire to claim, in this case, any specific construction and arrangement of the mechanism whereby the registration of the amount of gas dispensed is effected; my present claims being limited to the peculiar construction and arrangement of the casing whereby such accessibility with respect to its interior compartments is attained with the minimum weight of the structure and affording such elasticity with respect to the whole casing that it is capable of withstanding the rough usage to which it is necessarily subjected, without breakage or leakage, and the essential feature of my improved construction is the combination of the thin flexible walls of the casing with the less flexible pads and cover plate frames and appurtenant parts which are shown in separated relation in Fig. VI.

Therefore, it is to be understood that I do not desire to limit myself to the precise details of construction and arrangement herein set forth, as it is obvious that various modifications may be made therein without departing from the essential features of my invention, as defined in the appended claims.

I claim:

1. In a gas meter, the combination with an outer quadrangular casing, having thin sheet metal walls, enclosing four compartments, comprising two bellows compartments, separated by a central vertical partition, permanently fixed in said casing, a crank compartment extending above both said bellows compartments, and separated therefrom by a horizontal partition permanently fixed in said casing, a valve compartment, in said crank compartment and separated therefrom by a vertical partition; each of said four compartments having an opening affording access to its interior; of primarily separate annular pads of heavier metal than said casing walls and permanently connected with the latter respectively surrounding each of said opening; each of said pads having a series of screw threaded sockets extending therein at right angles to its plane; respective gaskets, of cellulose fabric, coated with adhesive cement, and fitted to the exterior faces of said pads; four cover plates respectively adapted to removably close said four openings, and each comprising a thin sheet metal plate coextensive with the outside dimensions of its respective pad, and having holes therethrough adapted to register with said sockets in the respective pads; four annular cover plate frames, separate and independent of the respective cover plates, but complementary to the respective pads for said cover plates; said cover plate frames having holes therethrough adapted to register with said sockets in the respective pads; screws fitted to extend loosely through the holes in said cover plates, in screw threaded engagement with said sockets, said cover plate frames being flexible enough to conform to the variable configuration of said pads incident to flexure of the meter casing; whereby said cover plates may be clamped to said pads and engage said gaskets between the cover plate frames and pads to form gas tight joints; and, respective pockets at the exteriorly exposed surfaces of said cover plates, arranged to hold sealing means in conjunction with said clamping means; whereby, it is necessary to break said sealing means to release said clamping means and remove said exterior cover plates.

2. In a gas meter, the combination with an outer quadrangular casing, having thin sheet metal walls, enclosing four compartments, comprising two bellows compartments, separated by a partition, permanently fixed in said casing, a crank compartment extending above both said bellows compartments, and separated therefrom by a partition permanently fixed in said casing, a valve compartment, in said crank compartment and separated therefrom by a partition; each of said four compartments having an opening affording access to its interior; of primarily separate annular pads of heavier metal than said casing walls and permanently connected with the latter respectively surrounding each of said openings; each of said pads having a series of screw threaded sockets extending therein at right angles to its plane; respective gaskets, fitted to the exterior faces of said pads; four cover plates respectively adapted to removably close said four openings, and each comprising a thin sheet metal plate co-extensive with the outside dimensions of its respective pad, and having holes therethrough adapted to register with said sockets in the respective pads; four annular cover plate frames, separate and independent of the respective cover plates, but complementary to the respective pads for said cover plates; said cover plate frames having holes therethrough adapted to register with said sockets in the respective pads; screws fitted to extend loosely through the holes in said cover plates, in screw threaded engagement with said sockets, said cover plate frames being flexible enough to conform to the variable configuration of said pads incident to flexure of the meter casing; whereby said cover plates may be clamped to said pads and engage said gaskets between the cover plate frames and pads to form gas tight joints; and, respective pockets at the exteriorly exposed surfaces of said cover plates, arranged to hold sealing means in conjunction with said clamping means; whereby, it is necessary to break said sealing means to release said clamping means and remove said exterior cover plates.

3. In a gas meter, the combination with an outer casing, having thin sheet metal walls, enclosing four compartments, comprising two bellows compartments, separated by a partition, permanently fixed in said casing, a crank compartment extending above both said bellows compartments, and separated therefrom by a partition permanently fixed in said casing, a valve compartment, in said crank compartment and separated therefrom by a partition; each of said four compartments having an opening affording access to its interior; of primarily separate annular pads of heavier metal than said casing walls and permanently connected with the latter respectively surrounding each of said openings; each of said pads having a series of sockets extending therein at right angles to its plane; respective gaskets, fitted to the exterior faces of said pads; cover plates respectively adapted to removably close said openings, and each comprising a thin sheet metal plate fitted to its respective pad, and having holes therethrough adapted to register with said sockets in the respective pads; annular cover plate frames, separate and independent of the respective cover plates but complementary to the respective pads for said cover plates; said cover plate frames having holes therethrough adapted to register with said sockets in the respective pads; screws fitted to extend through the holes in said cover plates, in engagement with said sockets; whereby said cover plates may be clamped to said pads and engage said gaskets between the cover plate frames and pads to form gas tight joints; and, respective pockets at the exteriorly exposed surfaces of said cover plates, arranged to hold sealing means in conjunction with said clamping means; whereby, it is necessary to break said sealing means to release said clamping means and remove said exterior cover plates.

4. In a gas meter, the combination with an outer quadrangle casing, having thin sheet metal walls, enclosing four compartments, comprising two bellows compartments, separated by a vertical partition, permanently fixed in said casing, a crank compartment extending above both said bellows compartments, and separated therefrom by a partition permanently fixed in said casing, a valve compartment, in said crank compartment and separated therefrom by a partition; each of said four compartments having an opening affording access to is interior; of primarily separate annular pads of heavier metal than said casing walls and permanently connected with the latter respectively surrounding each of said openings; each of said pads having a series of sockets extending therein at right angles to its plane; respective gaskets, fitted to the exterior faces of said pads; cover plates respectively adapted to removably close said openings, and each comprising a thin sheet metal plate coextensive with the outside dimensions of its respective pad, and having holes therethrough adapted to register with said sockets in the respective pads; annular cover plate frames, separate and independent of the respective cover plates but complementary to the respective pads for said cover plates; said cover plate frames having holes therethrough adapted to register with said sockets in the respective pads; screws fitted to extend through the holes in said cover plates, in engagement with said sockets, whereby said cover plates may be clamped to said pads and engage said gaskets between the cover plate frames and pads to form gas tight joints; and, sealing means in conjunction with said clamping means; whereby, it is necessary to break said sealing means to release said clamping means and remove said exterior cover plates.

5. In a gas meter, the combination with an outer quadrangular casing, having thin sheet metal walls, enclosing four compartments, comprising two bellows compartments, separated by a vertical partition, permanently fixed in said casing, a crank compartment extending above both said bellows compartments, and separated therefrom by a partition permanently fixed in said casing, a valve compartment, in said crank compartment and separated therefrom by a partition; each of said four compartments having an opening affording access to its interior; of primarily separate annular pads of heavier metal than said casing walls and permanently connected with the latter respectively surrounding each of said openings; each of said pads having a series of sockets extending therein at right angles to its plane; respective gaskets, fitted to the exterior faces of said pads; cover plates respectively adapted to removably close said openings, and each comprising a thin sheet metal plate coextensive with the outside dimensions of its respective pad, and having holes therethrough adapted to register with said sockets in the respective pads; annular cover plate frames, separate and independent of the respective cover plates but complementary to the respective pads for said cover plates; said cover plate frames having holes therethrough adapted to register with said sockets in the respective pads; and, screws, fitted to extend through the holes in said cover plates, in engagement with said sockets, whereby said cover plates may be clamped to said pads and engage said gaskets between the cover plate frames and pads to form gas tight joints.

6. In a gas meter, the combination with an outer casing, having thin sheet metal walls, enclosing separate bellows compartments, a crank compartment and a valve compartment, in said crank compartment and separated therefrom by a partition; each of said compartments having an opening affording access to its interior; of annular pads of heavier metal than said casing walls and permanently connected with the latter respectively surrounding each of said openings; each of said pads having a series of sockets extending therein; respective gaskets, fitted to the exterior faces of said pads; cover plates adapted to removably close said openings, and each comprising a thin sheet metal plate coextensive with the outside dimensions of its respective pad, and having holes therethrough adapted to register with said sockets in the respective pads; four annular cover plate frames, separate and independent of the respective cover plates but complementary to the respective pads for said cover plates; said cover plate frames having holes therethrough adapted to register with said sockets in the respective pads; screws fitted to extend through the holes in said cover plates, in engagement with said sockets; whereby said cover plates may be clamped to said pads and engage said gaskets between the cover plate frames and pads to form gas tight joints; and, sealing means in conjunction with said clamping means; whereby, it is necessary to break said sealing means to release said clamping means and remove said cover plates.

In testimony whereof, I have hereunto signed my name at Philadelphia, Pennsylvania, this twenty fifth day of October, 1921.

WAKEMAN GRIFFIN GRIBBEL.

Witnesses:
 CHARLES ATHERTON,
 JOHN W. JONES.